(No Model.)

H. DEICHMANN.
SCISSORS OR SHEARS.

No. 363,049. Patented May 17, 1887.

Witnesses

Inventor
Hermann Deichmann
By his Attorney

UNITED STATES PATENT OFFICE.

HERMANN DEICHMANN, OF ELIZABETH, NEW JERSEY.

SCISSORS OR SHEARS.

SPECIFICATION forming part of Letters Patent No. 363,049, dated May 17, 1887.

Application filed January 24, 1887. Serial No. 225,309. (No model.)

*To all whom it may concern:*

Be it known that I, HERMANN DEICHMANN, a citizen of the United States, residing at Elizabeth, in the county of Union and State of New Jersey, have invented certain new and useful Improvements in Shears, of which the following is a specification, reference being had therein to the accompanying drawings.

My invention relates to that class of shears or scissors the blades of which are held in cutting contact with each other by a spring, the said invention being more particularly adapted for use in connection with heavy shears, such as are used by tailors.

The two blades or members of my shears are connected by a pivot-bolt passing through the central parts of said members, said bolt having a conical or tapering head fitting a conical recess or countersink in one of the said members, and being provided at its end opposite the said head with a threaded socket, in which fits a screw, beneath the head of which is a curved plate spring having a hole near its center for the passage of the said bolt. The two ends of the said spring are both in contact with one of the members of the shears, and the outer surface of its central portion impinges against the under side of the screw-head, so that the said spring has a tendency to force the blades together, and the pressure exerted by the said spring may be adjusted by turning the screw in or out. To prevent the bolt from turning with the screw when the latter is adjusted, the said bolt is formed with a flattened portion, and the hole in the spring, through which the said bolt passes, has a flattened side to fit the flattened part of the bolt, one end of the said spring being connected with the shear member, against which it presses, by a pin.

Figure 1:
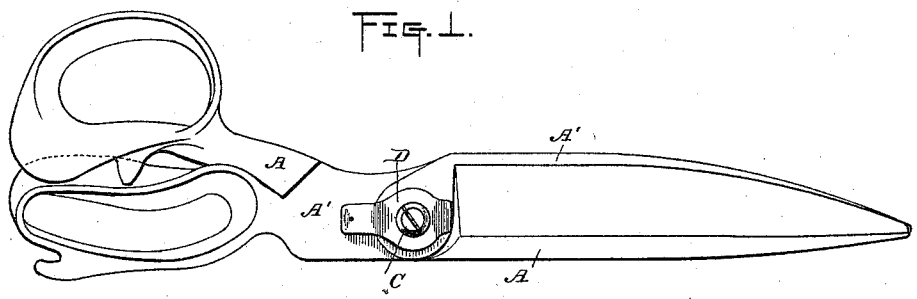
Figure 2:
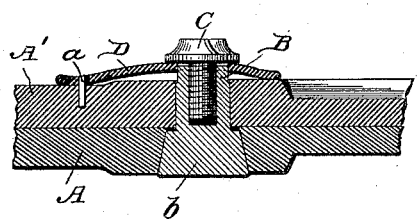
Figure 3:
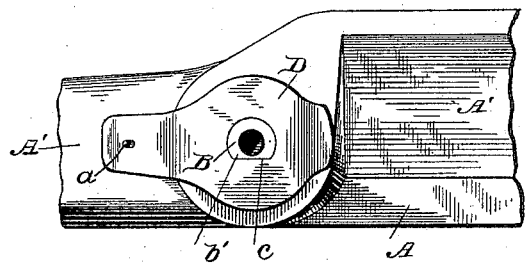

In the accompanying drawings, Figure 1 represents a pair of shears embodying my invention. Fig. 2 is a detail sectional view of the central part of the same, and Fig. 3 is a detail plan view showing the spring and also the end of the bolt.

The two members, A A', of the shears have blades and handles of ordinary construction. B is the pivot-bolt, passing rather loosely through the central portions of the said members, said bolt having a tapering or conical head, $b$, fitting a conical recess in the member A, and having in its end opposite the said head a threaded socket for the reception of the screw C, beneath the head of which is the curved or bow spring D, pressing against the member A', and thus serving to hold the edges of the blades in cutting contact with each other. The bolt B, at the end thereof which passes through the said spring, is provided with a flattened portion at $b'$, and the hole in the spring formed for the reception of the said bolt has a flattened side at $c$. One end of the said spring is connected with the shear member A' by a pin, $a$, which is, in the present instance, shown as being fixed in the said shear member and entering a hole in the spring, but which might of course be attached to the spring and arranged to enter a hole in the said member. This construction of the spring and bolt prevents the latter from turning with the screw C when the tension of the spring is adjusted by turning the said screw in or out.

From the foregoing it will be apparent that the cutting-edges of the blades will be held in yielding contact by a suitable spring-pressure, and as the spring D has a double bearing (at its two ends) against the shear member A', the movement of the latter relative to its co-operating member in cutting will be properly steadied, so that the blades will work together smoothly. The bolt B turns with the member A', and the conical head $b$ of the former affords an extended bearing for the said bolt in the shear member A.

I am aware that various forms of springs have heretofore been used in shears and scissors for pressing the blades thereof together in cutting, and I do not therefore wish to be understood as claiming this feature, broadly; but I believe that my invention as hereinbefore described presents certain advantages in cheapness and simplicity of construction and efficiency of operation over other similar devices heretofore known.

Having thus described my invention, I claim and desire to secure by Letters Patent—

The combination, with the shear blades or members and a headed pivot-bolt passing through the same, and having a threaded socket and a flattened portion near the end opposite its head, of the screw fitting in said socket, the curved plate-spring beneath the head of the said screw, said spring having near its center a hole one side of which is flat, and a pin for connecting one end of said spring with one of the said members, substantially as set forth.

In testimony whereof I affix my signature in presence of two witnesses.

HERMANN DEICHMANN.

Witnesses:
 HENRY SHEA,
 FREDERICK KIMMLER.